Patented Nov. 25, 1924.

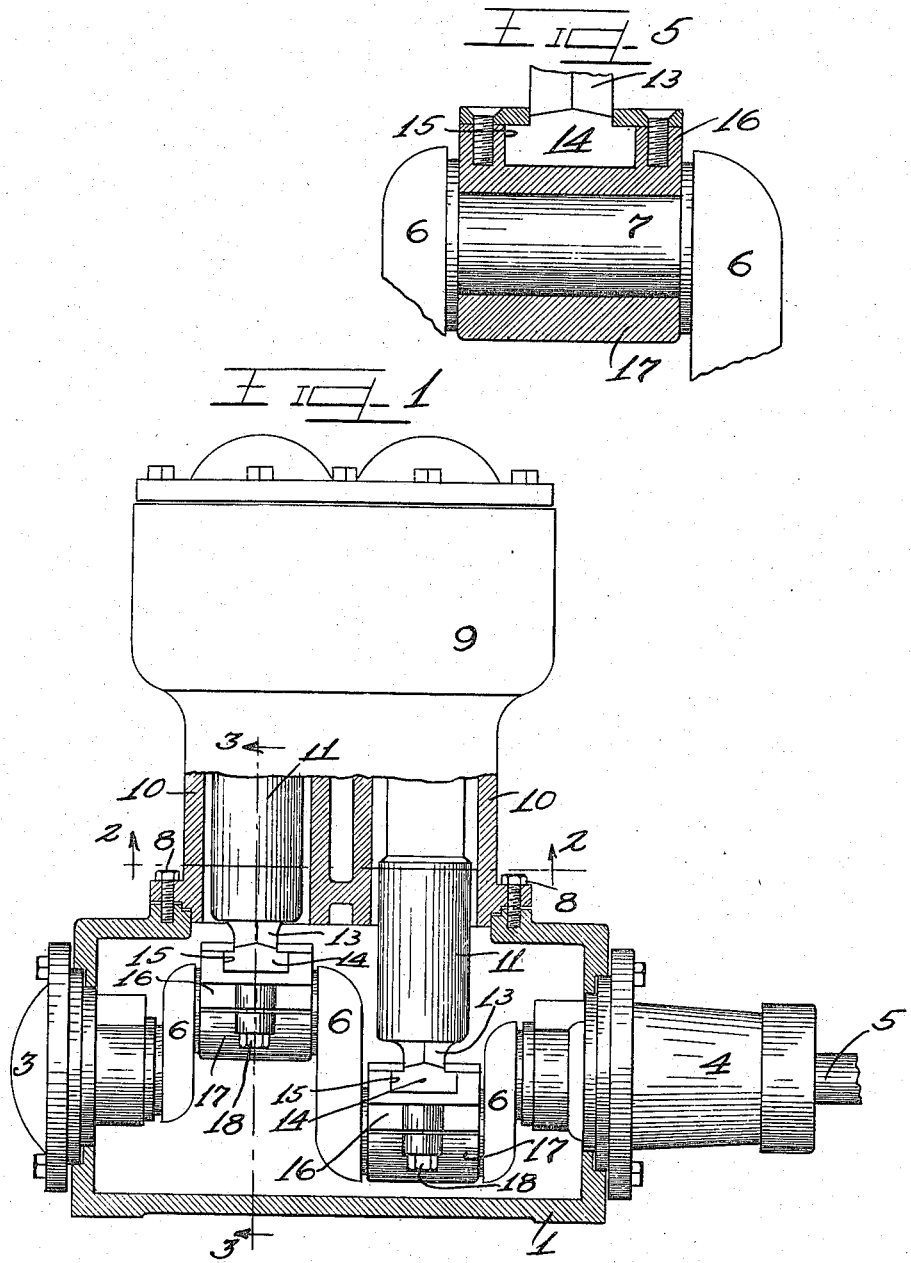

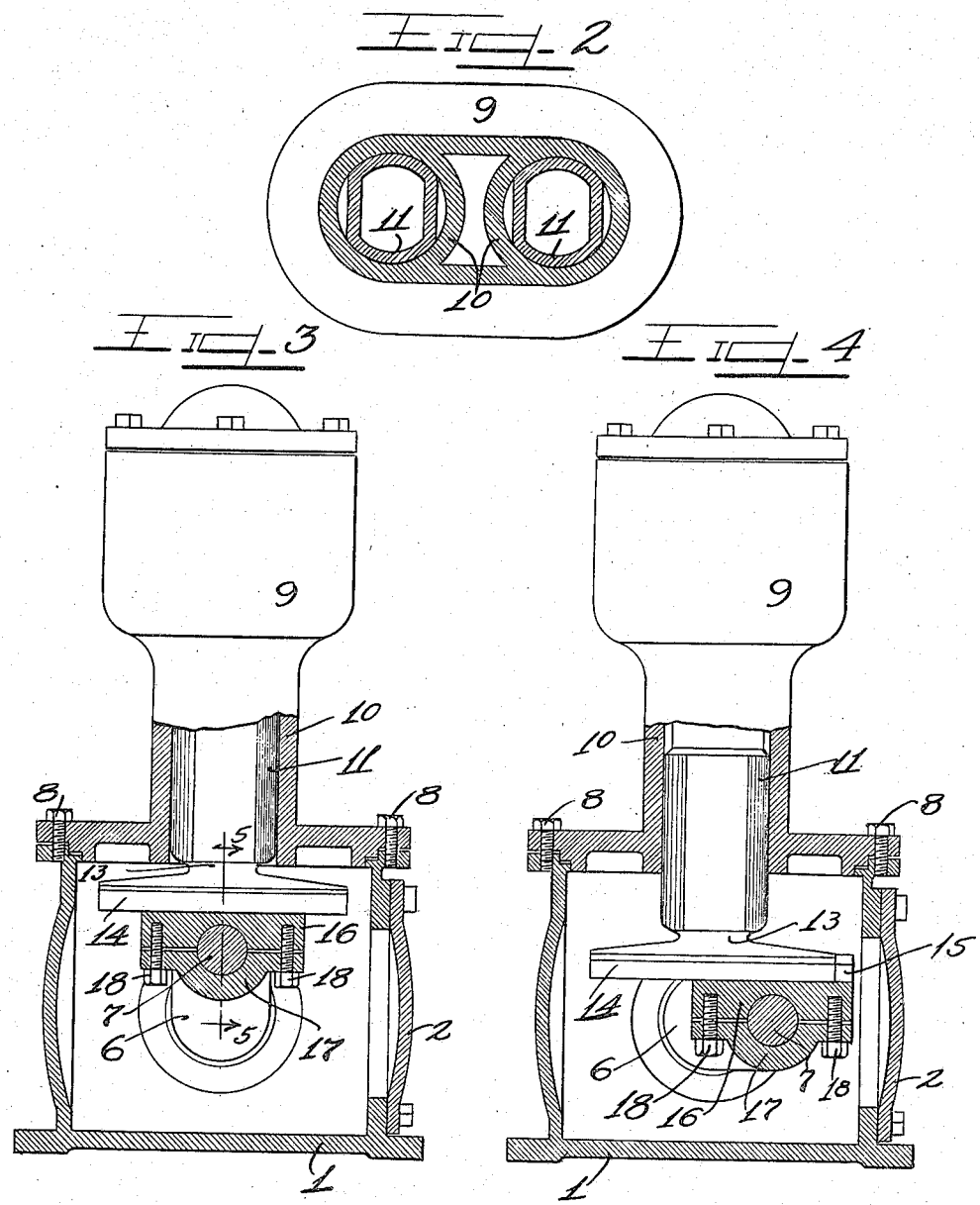

1,517,039

UNITED STATES PATENT OFFICE.

WILLIAM WISHART AND ALBERT H. MORRELL, OF CLINTON, IOWA, ASSIGNORS, BY MESNE ASSIGNMENTS, TO CLIMAX ENGINEERING COMPANY, OF CLINTON, IOWA, A CORPORATION OF DELAWARE.

CRANK-SHAFT MECHANISM.

Application filed June 6, 1921. Serial No. 475,179.

*To all whom it may concern:*

Be it known that we, WILLIAM WISHART and ALBERT H. MORRELL, citizens of the United States, and residents of the city of Clinton, in the county of Clinton and State of Iowa, have invented certain new and useful Improvements in a Crank-Shaft Mechanism; and we do hereby declare that the following is a full, clear, and exact description of the same, reference being had to the accompanying drawings, and to the numerals of reference marked thereon, which form a part of this specification.

This invention relates more particularly to an improved type of a mechanism for connecting the piston of an engine or compressor with a crank pin of a crank shaft to permit the piston to be reciprocated within a cylinder without any tendency to cause tilting of said piston when operated.

It is an object of this invention to provide an improved mechanism for connecting an engine piston with a crank shaft.

It is also an object of the invention to provide a crank shaft with a crank pin collar adapted to slidably receive the headed end of a piston.

It is a further object of the invention to afford an improved type of connection between a piston and a crank shaft bearing box to insure positive and proper lubrication of all the moving parts.

It is furthermore an object of this invention to replace the connecting rod between a crank shaft bearing and a piston by an improved connecting mechanism, the various parts of which are all adapted to be positively lubricated by submersion in a bath of oil in the crank case, thereby obviating any trouble resulting from operating parts becoming dry.

It is an important object of this invention to provide a crank shaft the crank pins of which have engaged thereon slotted members adapted to slidably engage heads or shoes formed on the ends of pistons which are to be operated by the crank shaft.

Other and further important objects of this invention will be apparent from the disclosures in the specification and drawings.

The invention (in a preferred form) is illustrated in the drawings and hereinafter more fully described.

In the drawings:

Figure 1 is an elevation of an engine or compressor partly shown in section to disclose the crank shaft mechanism embodying the principles of this invention.

Figure 2 is a section taken on line 2—2 of Figure 1.

Figure 3 is a sectional view taken on line 3—3 of Figure 1 showing the upper portion of the engine in elevation.

Figure 4 is a similar view showing the crank shaft rotated a quarter of a turn from the position shown in Figure 3.

Figure 5 is an enlarged detail section taken on line 5—5 of Figure 3 with parts in elevation.

As shown on the drawings:

The reference numeral 1 indicates a crank case having an opening in the top, front wall and in each of the end walls. The opening in the front wall is closed by a removable cover plate 2. Removably secured to the respective end walls of the crank case and projecting through the end wall openings are journal or bearing boxes 3 and 4 which serve to afford suitable bearings for rotatably supporting a crank shaft 5. The crank shaft operates in a bath of oil in the crank case and is provided with cranks 6 connected by crank pins 7.

Secured on the top of the crank case 1 by means of bolts 8 is an engine casting 9 which closes the top opening of said crank case. Forming a part of the casting 9 is a pair of parallel vertical cylinders 10. Each cylinder 10 has a piston 11 slidably mounted therein. Integrally formed axially on the bottom of each piston 11 is a stem or neck 13. Formed integrally at right angles on the lower end of each neck 13 is a horizontal plate or shoe 14 which is slidably engaged in a T-slot 15 formed in the upper portion of a top bearing box section 16. A bottom bearing box section 17 is removably secured to the bottom of the top bearing box section by bolts 18 or other suitable means. The bearing box sections or collars 16—17 are provided with semi-cylindrical grooves to permit said sections to be engaged around the crank pins 7 to permit operation of the pistons by the crank shaft.

The operation is as follows:

In the device illustrated in Figure 1 the device 9 mounted on the crank case 1 is a compressor adapted to be operated by the crank shaft 5. By applying a drive to the crank shaft 5 the crank pins 7 act to move the bearing members or collars 16—17 through circular paths thereby causing said collars to slide with respect to the piston shoes 14 to reciprocate the pistons 11 in the cylinders 10.

The novel arrangement of having the piston shoes 14 slidably engaged in the T-slots of the crank shaft collars permits the pistons to be reciprocated without any tendency to tilt the same within said cylinders to cause irregular wear of the parts.

The crank shaft mechanism may be used in an engine as well as in a compressor. The device is also adaptable to permit slidable movement of the collar with respect to the piston shoe when the piston is reciprocated to cause the crank shaft to rotate.

This invention eliminates the use of a connecting rod between the crank shaft bearing and the piston and substitutes the improved slidable connection to insure positive and proper lubrication of all the moving parts forming the connection. Where a connecting rod is used, it is impossible to properly lubricate the wrist pin which is connected with the piston, and as a result, the wrist pin becomes dry and causes trouble. In the present invention, the crank shaft, crank pins, bearing boxes and the slidable connections between the pistons and the bearing boxes are adapted to be properly submerged in oil in the crank case, thereby insuring proper lubrication of the operating parts and eliminating trouble resulting from improper lubrication.

We are aware that numerous details of construction may be varied through a wide range without departing from the principles of this invention, and we therefore do not purpose limiting the patent granted otherwise than necessitated by the prior art.

We claim as our invention:

1. The combination with a crank shaft and a piston, of a shoe integrally formed on one end of said piston, a collar journalled on a crank pin forming part of the crank shaft, said collar having a T-slot therein for receiving said shoe to permit slidable movement of said collar with respect to said shoe when the crank shaft is operated to reciprocate said piston, or when said piston is reciprocated to cause the crank shaft to rotate.

2. A crank shaft mechanism comprising a crank shaft, a crank pin forming a part thereof, a collar engaged on said crank pin, said collar embracing a lower section and an upper section secured to one another around said crank pin, said upper collar section having a T-slot therein, a piston, and a shoe plate formed on one end thereof and slidably engaged in said T-slot.

In testimony whereof, we have hereunto subscribed our names in the presence of two subscribing witnesses.

WILLIAM WISHART.
ALBERT H. MORRELL.

Witnesses:
  F. E. WOODS,
  JOSEPHINE SULLIVAN.